Nov. 10, 1936.  B. N. WALLIS  2,060,387
AIRCRAFT BODY STRUCTURE
Filed Jan. 20, 1936  3 Sheets-Sheet 1
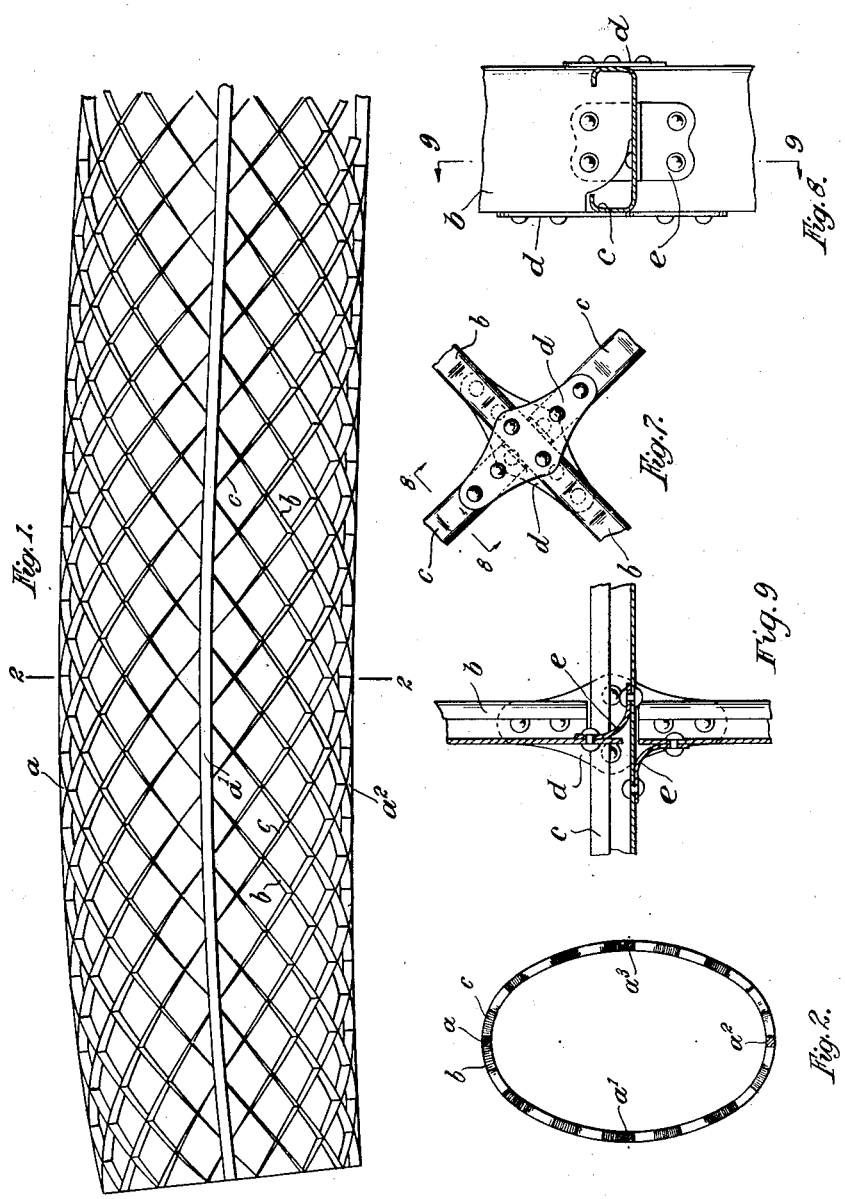

Nov. 10, 1936.   B. N. WALLIS   2,060,387
AIRCRAFT BODY STRUCTURE
Filed Jan. 20, 1936   3 Sheets-Sheet 2
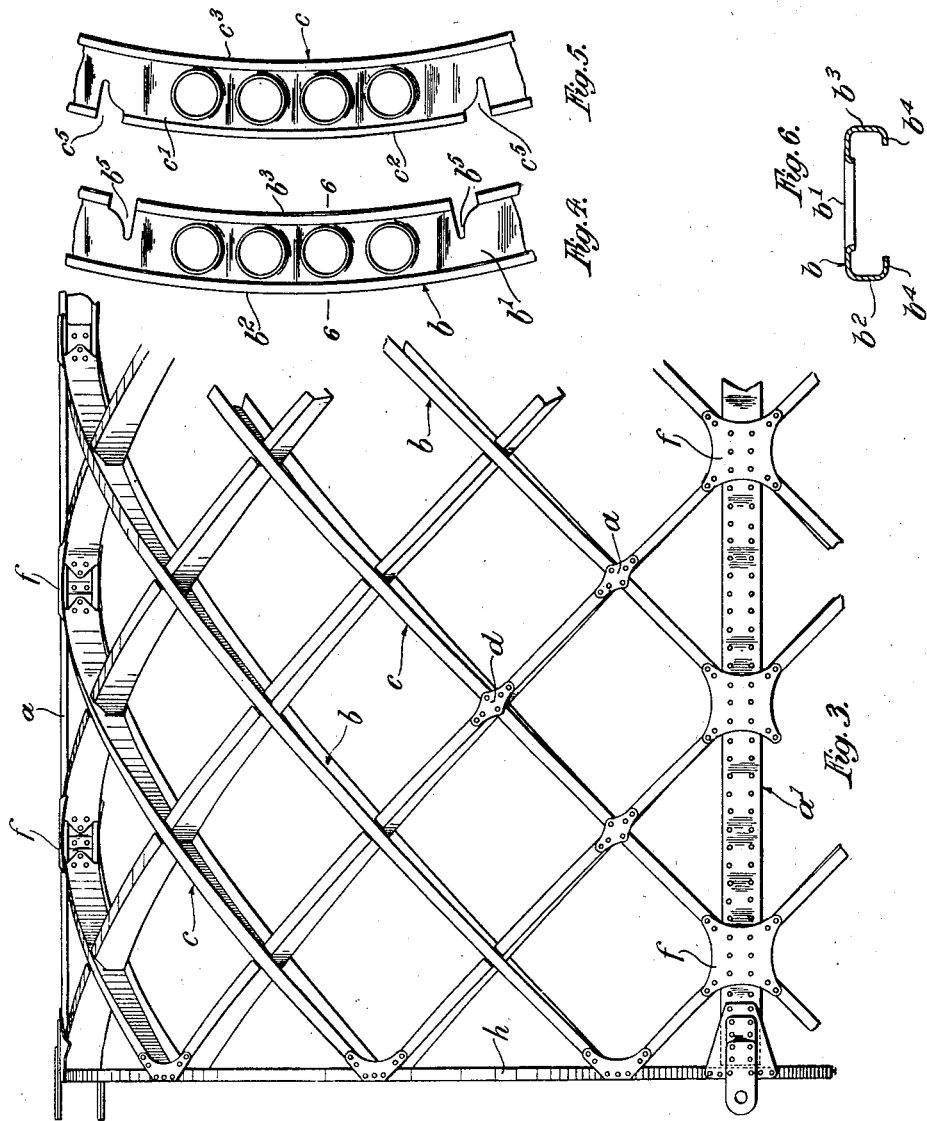

Nov. 10, 1936.   B. N. WALLIS   2,060,387
AIRCRAFT BODY STRUCTURE
Filed Jan. 20, 1936   3 Sheets-Sheet 3
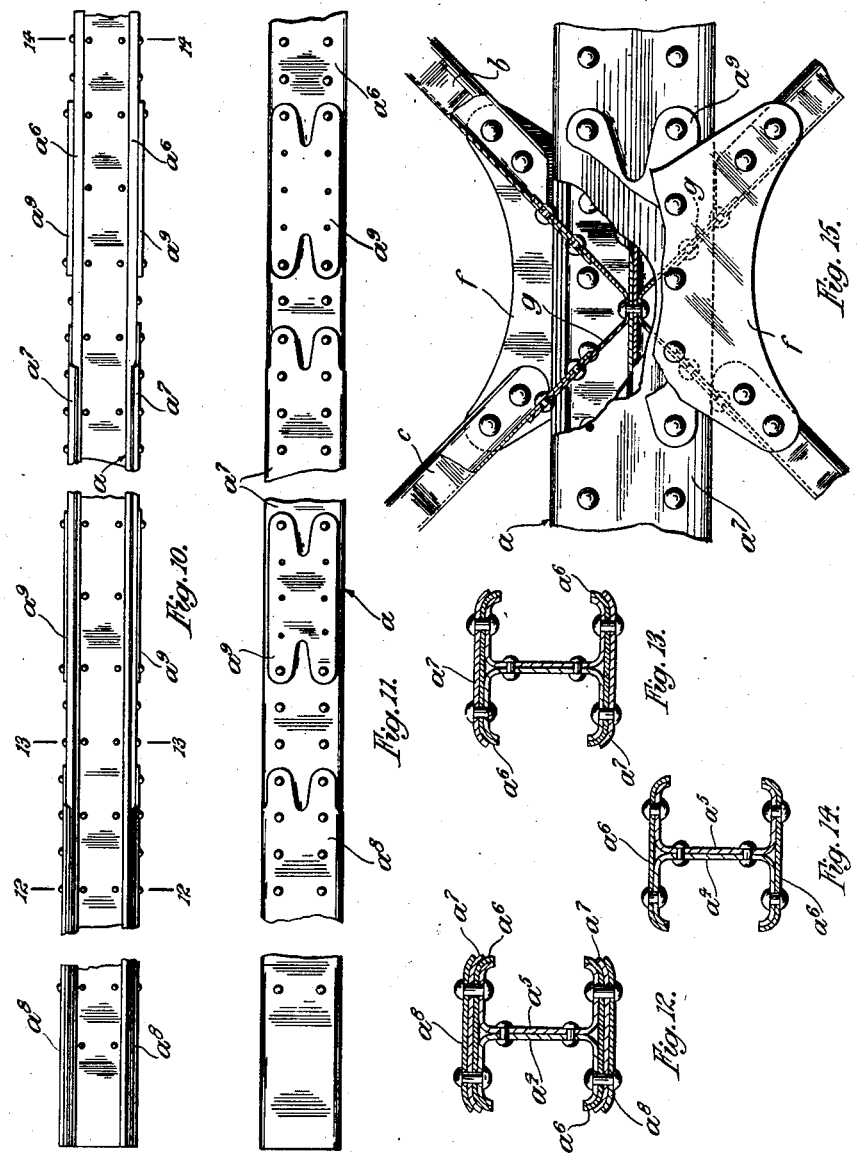

Patented Nov. 10, 1936

2,060,387

UNITED STATES PATENT OFFICE 2,060,387

AIRCRAFT BODY STRUCTURE

Barnes Neville Wallis, Weybridge, England, assignor to Vickers (Aviation) Limited, Weybridge Surrey, England Application January 20, 1936, Serial No. 59,982
In Great Britain February 27, 1935

5 Claims. (Cl. 244—30)

This invention relates to fuselages, wings and other aircraft body structures of the type described in United States Patents Nos. 1,894,011 and 1,985,649 which are constructed of longitudinal members and two series of bracing members, all of which intersect each other, and said bracing members lie in geodetic lines on the surface of the fuselage, wing or other body.

In such structures, when twisted, one series of geodetic members is put into compression and tends to increase its curvature, while the other series of geodetic members is put into tension and tends to decrease its curvature, so that by rigidly securing them to each other, they can be arranged to balance the radially directed forces set up in each system by the loading. On the structure being also subjected to lateral forces a similar balance between the geodetic members carrying tension and compression forces is attained, while the longitudinal members take the end forces caused by bending moments set up by the lateral loading on the structure. In this construction, the geodetic bracing members in each series are of greater depth than width and they are made in separate lengths being curved to suit the contour and twisted to the required degree so that their depth is contained in radiating lines normal to the surface at all points in such a manner that when they abut and are secured together at all the intersections, they form continuations one of the other.

The object of this invention is to provide an improved construction of such geodetic members. A further object is to provide an improved arrangement of the longitudinal members in such bodies.

According to the present invention, the geodetic members, instead of being divided into separate lengths abutting where they intersect each other, are made continuous from one longitudinal member to the next. In the case of a wing or similar structures, the geodetic members will extend from a spar to other longitudinal elements such as the leading or trailing edges or to another spar. The geodetic members are of greater depth than width and at each intersection, one geodetic member is recessed at its inner edge and the crossing geodetic member is recessed at its outer edge in the manner known as "halving". At the intersections, the geodetic members are secured after laying together by means of angle plates fixed to the webs and by gusset plates riveted to the flanges in order to bridge the recess by connecting the interrupted flange and also connecting this flange to the uninterrupted flange of the other member located in the recess of the first member.

Further, in a fuselage or similar body, the longitudinal members are arranged one at the extreme top and one at the extreme bottom of the body so that in a fuselage of an aeroplane they lie in the plane of symmetry of the aircraft, and the remaining longitudinal members are arranged one at each side of the body in a plane which contains the axis of the body and is at right angles to the plane containing the top and bottom longitudinal members.

The longitudinal members in the fuselage, wing or other body may be continuous and formed of two channels of sheet metal placed back to back and connected to each other by rivets through their webs. Strengthening strips of metal are riveted to the flanges on the inner and outer surfaces of the channels. The number of strengthening strips attached to the longitudinal members depends on the location of the portion of the members. In the case of longitudinal members running the full length of the fuselage from the engine to the tail, the longitudinal members are strengthened by the application of a second, third or more strips which are applied to the central portions near the wings, the number of added strips being reduced towards the tail end of the fuselage.

In the accompanying drawings:—

Fig. 1 is a side elevation of a fuselage constructed of longitudinal members and geodetic members.

Fig. 2 is a cross-section on the line 2—2 in Fig. 1.

Fig. 3 is a side elevation of part of the fuselage drawn to an enlarged scale.

Figs. 4 and 5 are side views of parts of the geodetic members.

Fig. 6 is a section on the line 6—6 in Fig. 4.

Fig. 7 is a side elevation of the intersection joint drawn to an enlarged scale.

Fig. 8 is a section on the line 8—8 in Fig. 7.

Fig. 9 is a section on the line 9—9 in Fig. 8.

Figs. 10 and 11 are side elevation and plan respectively of one of the longitudinal members.

Figs. 12, 13 and 14 are sections on the lines 12—12, 13—13, and 14—14 respectively in Fig. 10.

Fig. 15 is a detail illustrating on an enlarged scale the method of attaching the geodetic members to the longitudinal member.

As shown the longitudinal members $a$, $a^1$, $a^2$, $a^3$ are braced by two series of geodetic members $b$ and $c$. The geodetic members are each made of sheet metal formed as channels with webs $b^1$ or $c^1$ and with flanges $b^2$, $b^3$ or $c^2$, $c^3$, inturned at their edges to a bordering small curve $b^4$ or $c^4$. The series $b$ are recessed at $b^5$ on their inner edges and series $c$ at $c^5$ in their outer edges so that these members may be fitted together as shown in Fig. 8. Gusset plates $d$ extend longitudinally across the interrupted flanges $c^2$ to which they are riveted and these plates are also riveted to the uninterrupted flanges $b^2$. Similar gusset plates $d$ are fixed to the flanges $b^3$ and $c^3$.

Angle plates $e$ interconnect the webs of the geodetic members in one series to those in the other series.

The longitudinal members are arranged with the member $a$ at the extreme top. The member $a^2$ at the extreme bottom and the members $a^1$ and $a^3$ at either side of the body as shown in Fig. 2 and are built up of two continuous channel members $a^4$, $a^5$, arranged back to back and strengthening strips $a^6$, $a^7$, $a^8$, are riveted to both their inner and outer flanges. The strip $a^8$ extends only a short distance along the longitudinal member, the strip $a^7$ extends a longer distance and the strip $a^8$ extends to the end. The combined depth of the channel members and strips is equal to that of the geodetic members so that these can be connected to each other by star shaped gusset plates $f$ as shown in Fig. 3. Beyond the point where, however, strips $a^8$, or $a^7$ and $a^8$ are discontinued, packing pieces $a^9$ are provided at each point where the geodetic members are attached to the longitudinal members to fill the gap between the gusset plates $f$ and the longitudinal members. The webs of the geodetic members are also attached to the channel members $a^4$, $a^5$ by angle plates $g$ as shown in Fig. 15.

At the ends of the structure the geodetic members are attached to a hoop $h$.

What I claim as my invention and desire to secure by Letters Patent is:—

1. An aircraft body structure comprising, in combination, longitudinal members, two series of geodetic members shaped to the contour of the body and of greater depth than width, said geodetic members being arranged in geodetic lines obliquely intersecting the longitudinal members and each other and being twisted about their neutral axes so that their depth is normal to the contour at all points, the geodetic members in both series being continuous from one longitudinal member to the next longitudinal member and having recesses at each point of intersection whereby the geodetic members in the two series can fit into each other and bridging members extending longitudinally of each geodetic member at each point of intersection, bridging the recess therein and interconnecting the edge of the said geodetic member at one side of the recess to the edge on the opposite side of the recess and also connecting these edges to the uninterrupted edge of a geodetic member in the other series.

2. An aircraft body structure comprising, in combination, longitudinal members, two series of geodetic members shaped to the contour of the body and of greater depth than width, said geodetic members being arranged in geodetic lines obliquely intersecting the longitudinal members and each other and being twisted about their neutral axes so that their depth is normal to the contour at all points, the geodetic members in both series being continuous from one longitudinal member to the next longitudinal member and having recesses at each point of intersection whereby the geodetic members in the two series can fit into each other, bridging members extending longitudinally of each geodetic member at each point of intersection, bridging the recess therein and interconnecting the edge of the said geodetic member at one side of the recess to the edge on the opposite side of the recess and also connecting these edges to the uninterrupted edge of a geodetic member in the other series and means attached to the sides of the geodetic members at each intersection for interconnecting the geodetic members in the two series to each other.

3. An aircraft body structure comprising, in combination, longitudinal members, two series of channel section geodetic members having inner and outer lateral flanges and an inwardly directed web, said exterior flanges being shaped to the contour of the body and the webs being of greater depth than the width of the flanges, said geodetic members being arranged in geodetic lines obliquely intersecting the longitudinal members and each other and being twisted about their neutral axes so that their webs are normal to the contour at all points, the geodetic members in both series being continuous from one longitudinal member to the next longitudinal member and having at each point of intersection recesses extending through the inner flange and partly through the web of one geodetic member and through the outer flange and partly through the web of a crossing geodetic member whereby the geodetic members in the two series can fit into each other, bridging members extending longitudinally of each recessed flange at each point of intersection, bridging the recess therein and interconnecting the said flange at one side of the recess to the flange on the opposite side and also connecting these flanges to the uninterrupted flange of a geodetic member in the other series.

4. An aircraft body structure comprising, in combination, a plurality of longitudinal members each constructed of two channels arranged back to back, two series of geodetic members shaped to the contour of the body and of greater depth than width, said geodetic members being arranged in geodetic lines obliquely intersecting the longitudinal members and each other and being twisted about their neutral axes so that their depth is normal to the contour at all points, the geodetic members in both series being continuous from one longitudinal member to the next longitudinal member and having recesses at each point of intersection whereby the geodetic members in the two series can fit into each other and bridging members extending longitudinally of each geodetic member at each point of intersection, bridging the recess therein and interconnecting the edge of the said geodetic member at one side of the recess to the edge on the opposite side of the recess and also connecting these edges to the uninterrupted edge of a geodetic member in the other series.

5. An aircraft body structure comprising, in combination, a plurality of longitudinal members, strengthening strips attached to the longitudinal members, at least one of said strengthening strips extending for a part only of the length of the longitudinal member, two series of geodetic members shaped to the contour of the body and of greater depth than width, said geodetic members being arranged in geodetic lines obliquely intersecting the longitudinal members and each other and being twisted about their neutral axes so that their depth is normal to the contour at all points, the geodetic members in both series being continuous from one longitudinal member to the next longitudinal member and having recesses at each point of intersection whereby the geodetic members in the two series can fit into each other and bridging members extending longitudinally of each geodetic member at each point of intersection, bridging the recess therein and interconnecting the edge of the said geodetic member at one side of the recess to the edge on the opposite side of the recess and also connecting these edges to the uninterrupted edge of a geodetic member in the other series.

BARNES NEVILLE WALLIS.